United States Patent [19]

Kitamura

[11] Patent Number: 5,237,232

[45] Date of Patent: Aug. 17, 1993

[54] ROTOR OF AC GENERATOR

[75] Inventor: Yutaka Kitamura, Hyogo, Japan

[73] Assignee: Mitsubishi Denki K.K., Tokyo, Japan

[21] Appl. No.: 902,890

[22] Filed: Jun. 23, 1992

[30] Foreign Application Priority Data

Jun. 24, 1991 [JP] Japan ................... 3-180195

[51] Int. Cl.⁵ ............................................. H02K 1/22
[52] U.S. Cl. ...................................... 310/263; 310/208
[58] Field of Search ............... 310/263, 42, 261, 269, 310/216, 49 A, 208, 257

[56] References Cited

U.S. PATENT DOCUMENTS

| | | | |
|---|---|---|---|
| 3,305,740 | 2/1967 | Shano | 310/263 |
| 3,321,652 | 5/1967 | Opel | 310/263 |
| 4,114,056 | 9/1978 | Nimura | 310/263 |
| 4,488,075 | 12/1984 | De Cesare | 310/263 |
| 4,565,936 | 1/1986 | Ikegami et al. | 310/263 |
| 4,617,485 | 10/1986 | Nakamura et al. | 310/263 |
| 4,686,399 | 8/1987 | Imori et al. | 310/263 |
| 4,980,596 | 12/1990 | Arora | 310/263 |
| 5,081,383 | 1/1992 | Kusumoto et al. | 310/263 |

FOREIGN PATENT DOCUMENTS

| | | | |
|---|---|---|---|
| 2613194 | 11/1976 | Fed. Rep. of Germany | 310/263 |
| 0119586 | 5/1959 | U.S.S.R. | 310/263 |

Primary Examiner—R. Skudy
Attorney, Agent, or Firm—Sughrue, Mion, Zinn, Macpeak & Seas

[57] ABSTRACT

A rotor for an AC generator includes first and second iron cores which function as magnetic poles for the rotor and which are fixed to a shaft. A plurality of magnetic teeth project from the circumference of each iron core at a position where the iron cores contact each other to form troughs between the magnetic teeth. Each trough between the magnetic teeth is V-shaped, so that the weight of the rotor is reduced. Furthermore, each iron core has a ring recess portion at an outer end surface of the iron core and around the axis thereof.

5 Claims, 3 Drawing Sheets

ROTOR OF AC GENERATOR

BACKGROUND OF THE INVENTION

This invention relates to an AC generator comprising a rotor which is provided with a pair of iron cores for magnetic, poles including a plurality of magnetic pole teeth. specifically, the invention relates to reducing the weight of the iron cores of the magnetic poles.

FIG. 3 is a sectional view of a conventional AC generator for a vehicle. In FIG. 3, a stator 1 consists of a stator iron core 2 and a stator coil 3. A rotor 4 consists of magnetic pole iron cores 5 and 6 which each have a different polarity and include magnetic pole teeth 5a and 6a which are alternately disposed along a circumference of the iron cores 5 and 6 an exciting coil 7 to be held between the magnetic pole iron cores 5 and 6; axis 8 fixing the magnetic pole iron cores 5 and 6; a pair of slip rings 9 fixed to the rotor axis 8 through an insulating sleeve; and fans 10 and 11 fixed on the magnetic pole iron core 5 and 6. The stator iron core 2 is held between a front bracket 12 and a rear bracket 13 by a binding bolt 14. On the front bracket 12, a plurality of an inlet holes 12a and a plurality of an outlet holes 12b are provided. And on the rear bracket 13, a plurality of an inlet holes 13a and a plurality of an outlet holes 13b are provided for ventilation. The rotor axis 8 is supported on the front bracket 12 and the rear bracket 13 by bearings 15 and 16. A rectifier 18 rectifies an alternating current to a direct current, in which the alternating current is due to an alternating voltage to be induced in the stator coil 3. A voltage adjustor 19 controls an exciting current according to a detected generator voltage so as to adjust a terminal voltage to a predetermined value. A brush holder 20 keeps a brush 21 into contact with the slip ring 9. A protecting cover 22 which is provided with inlet holes 22a covers the rectifier 18 and the voltage adjustor 19. The above described generator allows a magnetic flux $\Phi$ to pass through the magnetic pole iron cores 5 and 6.

FIG. 4 is a drawing which explains a magnetic circuit of the stator cores and magnetic pole iron cores 5 and 6 of the generator shown in FIG. 3. The stator coils 3 are inserted in each slot of the stator iron core 2 and connected with one another by three phase system. Teeth portions 2a are provided on the stator iron core 2. The magnetic pole teeth portions 5a and 6a of the magnetic pole iron cores 5 and 6 are alternately disposed on the circumference position and are faced to align the teeth portions 2a of the stator iron core 2, where with a space exists between the magnetic pole teeth 5a and 6a, and the teeth portions 2a of the stator iron core 2. When the exciting current is supplied to the exciting coil 7 through the brush holder 20 and the slip ring 9, the magnetic teeth 5a are magnetized to an N pole and the magnetic teeth 6a are magnetized to an S pole so as to form a magnetic circuit with the stator iron core 2 by means of the magnetic flux $\Phi$.

When the rotor 4 is rotated, the alternating electromotive force is generated in the stator coil 3. The alternating current due to the electromotive force is rectified to the direct current by the rectifier 18. The output voltage corresponding to the rectified current is adjusted to a predetermined value by the voltage adjustor 19.

FIG. 5(a) is a side view of the magnetic pole iron core 5 viewed along the axial direction from the outside of the core 5. The magnetic flux $\Phi$, along an axial direction of a boss 5a, passes through a radial direction in one end of the iron core 5 and through each magnetic pole tooth 5a in the radial direction. The magnetic flux $\Phi$ passing through each magnetic pole tooth 5a comes into the corresponding teeth 2a of the stator iron core 2 positioned adjacent to the magnetic pole teeth 5a. FIG. 5(b) is a side view of the other magnetic pole iron core 6 viewed along the axial direction from the inside of the core 6. The magnetic flux $\Phi$ coming out of the iron core 2 comes into each of the magnetic teeth 6a by passing through the above described space and through a radial direction in one end side of the iron core 6. The magnetic flux $\Phi$ also moves and along an axial direction of a boss 6b, whereupon that, the magnetic flux $\Phi$ comes into the boss 5b as shown in FIG. 5(a), which is adjacent to the boss 6b.

On the iron cores 5 and 6 of the above described conventional AC generator, trough portions 5c are provided between the respective magnetic teeth 5a and 6a to have a U shape as shown in FIG. 5(a) and 6(b).

Recently, it has become important to reduce the weight of the AC generator.

SUMMARY OF THE INVENTION

Accordingly, an object of this invention is to provide an AC generator for a vehicle by reducing the weight of an iron core for a magnetic pole, and thereby reduce the weight of a rotor.

A first aspect of an AC generator according to the present invention provides for the AC generator to maintain a number of troughs between magnetic teeth of the magnetic pole which are formed like a V so that the weight of the magnetic iron core is reduced. Moreover, the V-shaped troughs are designed such that the width of each tooth along the circumference direction is not reduced.

A second aspect of the AC generator according to the present invention, provides for the iron core have to a ring recess portion placed at an outer end surface of the iron core and around an axis of the iron core, so that the weight of the magnetic iron core is further reduced.

In in accordance with the first aspect of the present invention, each trough of the iron core is formed like a V so that the weight of the magnetic iron core is reduced. It has been determined that the magnetic flux $\Phi$ does not pass through a bottom portion of the U shaped trough portion of the conventional iron core. Therefore, minimizing a portion of the trough by use of a U shaped trough does not interrupt the passage of the magnetic flux $\Phi$. Therefore, a resistance to the magnetic passage for the magnetic flux $\Phi$ is not increased.

Furthermore, in accordance with the second aspect of the present invention, since the iron core has the ring recess portion placed at the outer end surface of the iron core, the weight of the magnetic iron core is further reduced. Since the portion of the ring recess does not interrupt the passage of the magnetic flux $\Phi$, a resistance to the magnetic passage for the magnetic flux $\Phi$ is not increased.

Therefore, the present invention reduces the weight of the iron core for the magnetic pole, which in turn and reduces the weight of the rotor is reduced, by removing the a portion of the iron core that is unnecessary for the magnetic flux $\Phi$ to effectively pass trough the iron core.

DETAILED DESCRIPTION OF THE INVENTION

One preferred embodiment of this invention will be described with reference to the accompanying drawings.

Figure 1:
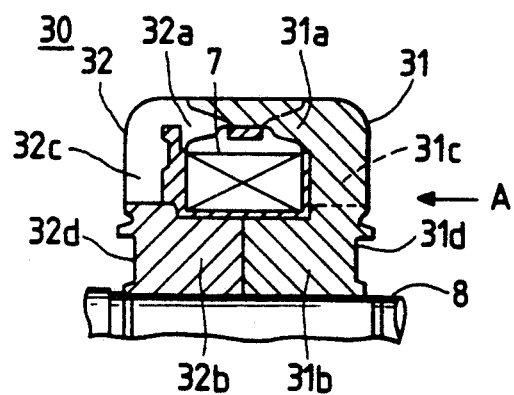
FIG. 1 is a sectional view showing a rotor of AC generator according to an example of this invention.
Figure 3:
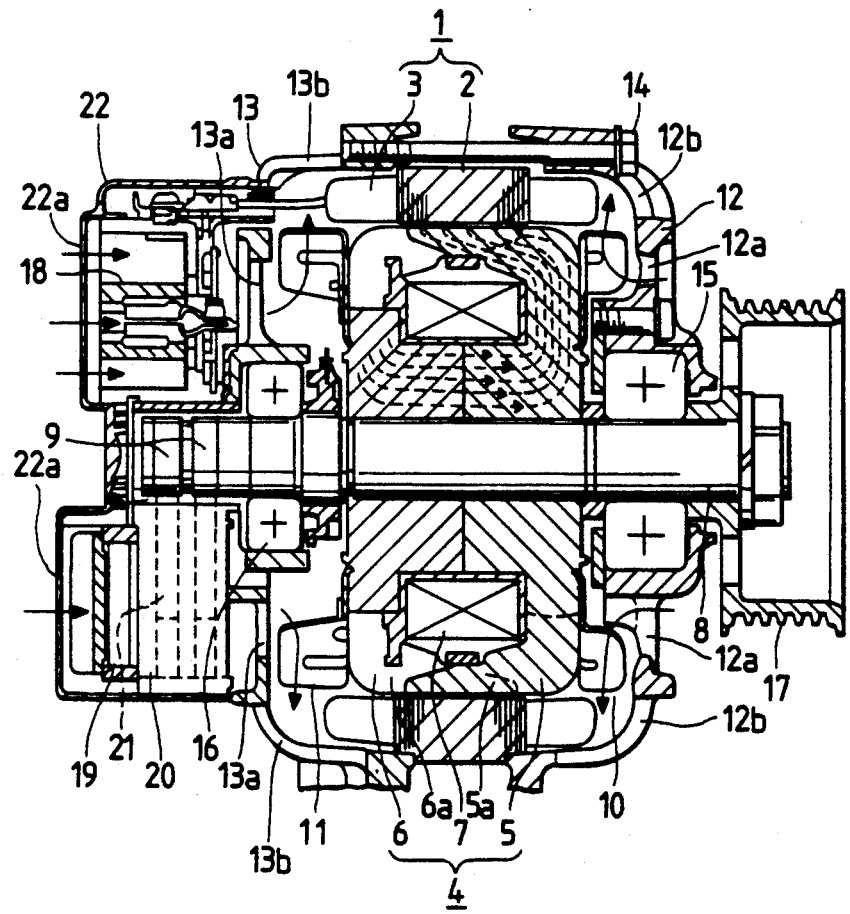
FIG. 3 is a sectional view of a conventional AC generator for a vehicle.
Figure 4:
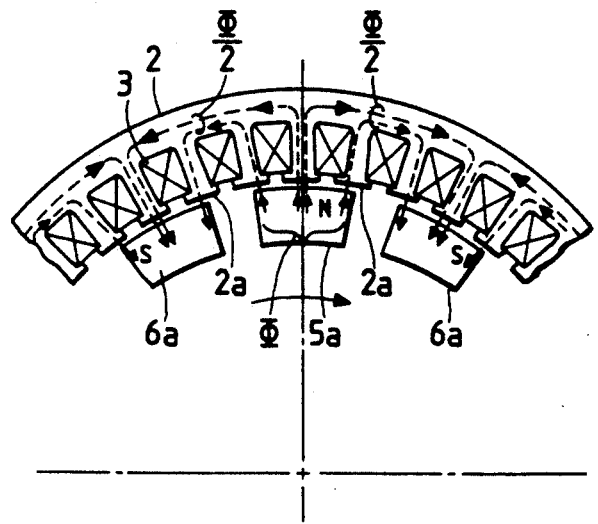
FIG. 4 shows a magnetic circuit between the magnetic teeth of the iron core and the stator in FIG. 3.

FIG. 1 is a sectional view showing an a rotor of AC generator according to an example of this invention. The same parts of the conventional AC generator shown in FIG. 3 are characterized with the same numerical references, A pair of iron cores 31 and 32 which are characterized as different magnetic polarity of a rotor 30 grip each other along the axial direction of the rotor 30 and are fixed on an axis 8. The bosses 31b and 32b, provided on the iron cores 31 and 32, respectively, are disposed to contact each other. A plurality of magnetic teeth 31a and 32a are provided to project from the circumference of the iron cores 31 and 32 at the side of the bosses 31b and 32b, respectively. Each of the bosses includes an inner surface and an outer surface. An exciting coil 7 is arranged between the iron cores 31 and 32. The bottom of troughs 31c between the adjoining teeth 31a are formed like a V boss 31b to decrease the weight of the rotor. The trough has a shape such that the width of each tooth along a circumferential direction is greater than a same width of the boss. A ring recess portion 31d is provided on an edge surface of the iron core 31 within an area of the boss 31b further decrease the weight of the rotor 30. Similarly, the bottom of troughs 32c between the adjoining teeth 32a are formed like a V near the boss 32b; and a ring recess portion 32d is provided on an edge surface of the iron core 32 within an area of the boss 32 b so as to decrease the weight of the rotor 30.

Figure 2:
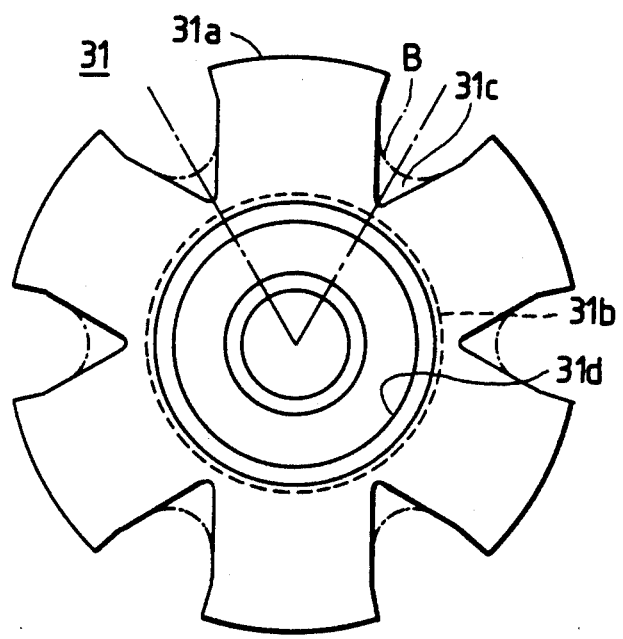
FIG. 2 is a side view of an iron core for a magnetic pole viewed along line A in FIG. 1.
Figure 5A:
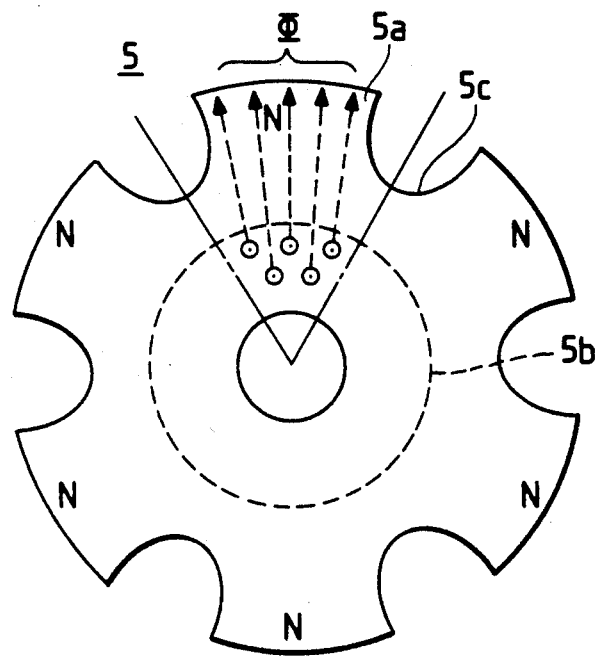
FIG. 5(a) is a side view of the outer edge side of the one side iron core in FIG. 3.
Figure 5B:
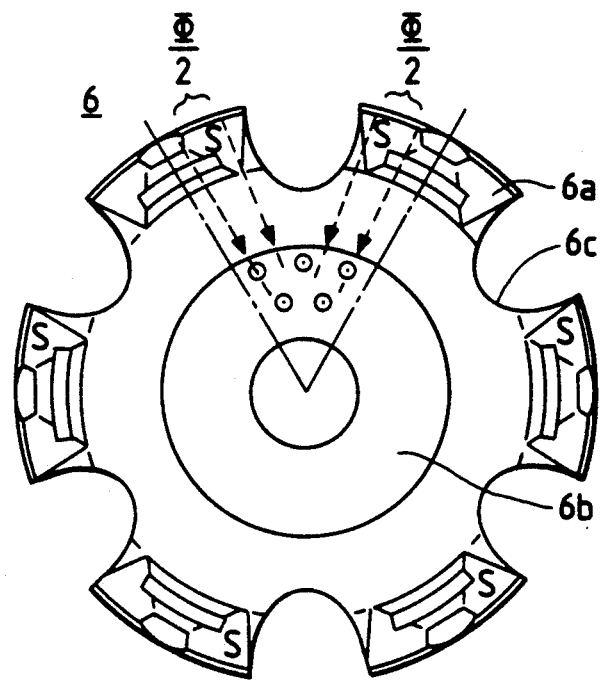
FIG. 5(b) is a side view of the inner edge side of the another side iron core in FIG. 3.

FIG. 2 is a side view of the iron core viewed along line an A shown in FIG. 1. The bottom of troughs 31c between the adjoining teeth 31a are formed like a V near the boss 31b. The portion indicated by a dotted line B shows a bottom line of the conventional trough portion as shown in FIG. 5(a). Thus, the iron cores 31 and 32, formed with the V-shaped trough 31c and 32c, reduce the weight of the rotor 30. Further, since the magnetic flux does not pass through the removed troughs 31c and 32c, the magnetic resistance is not increased. Furthermore, the the magnetic flux does not pass through the ring recess portions 31d and 32d also provided to reduce the weight. Therefore, the recess portions, similarly do not effect the amount of the magnetic flux conducted by the rotor.

By providing V-shaped troughs 31c and 32c, the weight of the rotor 30 is decreased 4%. In addition, by providing the ring recess portions 31d and 32d, the weight of the rotor is decreased 1%.

Furthermore, since the iron cores 31 and 32 are formed by a forging process, the above structure does not increase the number of manufacturing steps required to produce the iron cores 31 and 32.

In the AC generator according to the first aspect of the present invention, the weight of the rotor is reduced by providing V-shaped trough portions between the adjoining teeth without affecting to the magnetic flux. Furthermore, in the AC generator according to the second aspect of the present invention, the weight of the rotor is reduced by providing of the ring recess portions at an outer edge surface with the boss area without affecting the magnetic flux.

What is claimed is:

1. A rotor of an AC generator, comprising:
   a shaft for rotating said rotor,
   first and second iron cores which function as magnetic poles for said rotor, said first and second iron cores being fixed on said shaft where said first iron core contacts said second iron core along an axial direction of said rotor;
   an exciting coil for exciting said first and second iron cores with a different magnetic polarity, said exciting coil being arranged between said first and second iron cores; and
   a plurality of magnetic teeth projecting from said first and second iron cores, said plurality of magnetic teeth defining a plurality of V-shaped troughs disposed between each magnetic tooth of said plurality of magnetic teeth,
   wherein said plurality of magnetic teeth of said first and second iron cores are respectively disposed between said plurality of V-shaped troughs of said second and first iron cores.

2. A rotor of an AC generator according to claim 1, wherein:
   said first iron core includes a first boss and said second iron core includes a second boss, said first and second bosses each having an inner surface and an outer surface;
   said inner surface of said first boss contacts said inner surface of said second boss and said exciting coil is wrapped around said outer edges of said first and second bosses; and
   bottom portions of said V-shaped troughs are positioned near said first and second bosses.

3. A rotor of an AC generator according to claim 2, wherein each magnetic tooth of said plurality of magnetic teeth of said first and second iron cores define a width along a circumferential direction greater than same width of one of said first and second bosses.

4. A rotor of an AC generator according to claim 1, wherein said first and second iron cores each include an outer surface which defines a ring recess portion around said shaft.

5. A rotor of an AC generator according to claim 2, wherein said outer surfaces of said first and second bosses each define a ring recess portion.

* * * * *